US011814885B2

(12) United States Patent
Beyer

(10) Patent No.: US 11,814,885 B2
(45) Date of Patent: Nov. 14, 2023

(54) CLOSURE DEVICE, PREFERABLY FOR CLOSING A SEALING FLAP OF AN OPENING

(71) Applicant: KNAUF GIPS KG, Iphofen (DE)

(72) Inventor: Claus Beyer, Gerolzhofen (DE)

(73) Assignee: KNAUF GIPS KG, Iphofen (DE)

( * ) Notice: Subject to any disclaimer, the term of this patent is extended or adjusted under 35 U.S.C. 154(b) by 129 days.

(21) Appl. No.: 16/629,522

(22) PCT Filed: Jul. 20, 2017

(86) PCT No.: PCT/EP2017/000883
§ 371 (c)(1),
(2) Date: Jan. 8, 2020

(87) PCT Pub. No.: WO2019/015736
PCT Pub. Date: Jan. 24, 2019

(65) Prior Publication Data
US 2021/0131153 A1 May 6, 2021

(51) Int. Cl.
*E05C 3/24* (2006.01)
*E04F 19/08* (2006.01)
(Continued)

(52) U.S. Cl.
CPC .............. *E05C 3/24* (2013.01); *E04F 19/083* (2013.01); *E05B 65/006* (2013.01); *E05C 3/124* (2013.01); *E05C 19/022* (2013.01); *E05C 19/024* (2013.01)

(58) Field of Classification Search
CPC ..... Y10T 292/1056; E05C 3/24; E05C 3/124; E05C 19/022; E05C 19/024; E04F 19/083;
(Continued)

(56) References Cited

U.S. PATENT DOCUMENTS 369,198 A * 8/1887 Maxwell ............... E05B 65/006 292/257
861,406 A * 7/1907 Stetler ................... E05B 85/243 292/216
(Continued)

FOREIGN PATENT DOCUMENTS

BG 240116 A * 1/1925 ............. E05B 85/24
BG 733309 A * 12/1953 ............. E05B 85/28
(Continued)

OTHER PUBLICATIONS

International Search Report from International Patent Application No. PCT/EP2017/000883, dated Jan. 4, 2018.

*Primary Examiner* — Kristina R Fulton
*Assistant Examiner* — Steven A Tullia
(74) *Attorney, Agent, or Firm* — Greer, Burns & Crain, Ltd

(57) ABSTRACT

A closure device having a lock element that can be locked on a mating piece, preferably for closing a sealing flap of an opening, in particular an inspection flap, preferably in a drywall construction, in particular for a wall or a ceiling is provided.

A closure device is distinguished by the fact that the lock element is arranged in such a way that, preferably under the action of a spring, in a first position with respect to the mating piece it is or can be moved into a locking position and, in a second position, it reaches a position and/or a state without any blocking action.

21 Claims, 6 Drawing Sheets

(51) Int. Cl.

| | |
|---|---|
| ***E05B 65/00*** | (2006.01) |
| ***E05C 3/12*** | (2006.01) |
| ***E05C 19/02*** | (2006.01) |

(58) Field of Classification Search

CPC ........ E05B 65/006; E05B 85/20; E05B 85/24; E05B 85/243; E05B 85/247; E05B 85/26; E05B 85/28; E05B 15/0006; E05B 17/0037; Y10S 292/04; Y10S 292/10; Y10S 292/53; Y10S 292/54; Y10S 292/61

See application file for complete search history.

(56) References Cited

U.S. PATENT DOCUMENTS

| | | | | | |
|---|---|---|---|---|---|
| 1,138,026 | A | * | 5/1915 | Taylor | E05B 85/24 292/213 |
| 1,269,467 | A | * | 6/1918 | Leonard | E05B 85/243 292/216 |
| 2,501,151 | A | * | 3/1950 | Bayardi | A44B 5/002 24/97 |
| 2,703,730 | A | * | 3/1955 | Sersland | E05C 19/024 292/340 |
| 2,914,792 | A | * | 12/1959 | Campbell, Jr. | E05C 19/022 16/82 |
| 3,537,740 | A | * | 11/1970 | Brockman | E05B 85/243 292/198 |
| 3,832,736 | A | * | 9/1974 | Schuchman, Jr. | A44B 5/002 2/123 |
| 3,841,693 | A | * | 10/1974 | Reynolds | B62D 33/071 180/89.15 |
| 3,862,773 | A | * | 1/1975 | Bisbing | E05C 19/022 292/DIG. 4 |
| 4,005,888 | A | * | 2/1977 | Moeller | E05B 65/006 292/256.71 |
| 4,470,623 | A | * | 9/1984 | Judge, Jr. | E05B 65/006 292/256.75 |
| 4,635,763 | A | * | 1/1987 | Omata | B60N 3/083 131/237 |
| 5,087,088 | A | * | 2/1992 | Milam | E05C 5/00 292/110 |
| 9,282,789 | B1 | * | 3/2016 | Lavoie | E05C 19/022 292/DIG. 4 |
| 2006/0261604 | A1 | * | 11/2006 | Ya | G06F 1/181 292/218 |
| 2007/0056231 | A1 | | 3/2007 | Dimario et al. | |
| 2008/0098658 | A1 | * | 5/2008 | Niazy | E05B 65/0007 49/394 |
| 2014/0109484 | A1 | * | 4/2014 | Szyjkowski | E04F 19/083 49/465 |
| 2014/0319854 | A1 | * | 10/2014 | Lee | E05B 65/006 292/336.3 |
| 2015/0020459 | A1 | * | 1/2015 | Chwala | F23J 13/08 49/465 |

FOREIGN PATENT DOCUMENTS

| | | | | | |
|---|---|---|---|---|---|
| CA | 2270085 | A1 | * | 10/2000 | F16B 5/065 |
| CH | 466075 | A | * | 2/1968 | E05B 47/0047 |
| DE | 853112 | C | * | 2/1950 | E05B 85/24 |
| DE | 1033084 | B | * | 12/1953 | E05B 85/28 |
| DE | 3736060 | C1 | | 12/1988 | |
| DE | 20210036 | U1 | * | 10/2002 | E05C 19/022 |
| DE | 102004040175 | A1 | | 3/2006 | |
| DE | 202008013483 | U1 | * | 2/2009 | E04F 19/08 |
| DE | 202008016931 | U1 | * | 5/2009 | E04F 19/083 |
| DE | 202008016931 | U1 | * | 6/2009 | E04F 19/083 |
| DE | 102015220064 | A1 | * | 5/2016 | B60J 5/047 |
| EP | 1529905 | A1 | * | 5/2005 | B60J 7/1851 |
| EP | 3321430 | A1 | * | 5/2018 | E03D 1/0125 |
| FR | 2401295 | A1 | * | 8/1977 | E05B 85/26 |
| FR | 2897380 | A1 | * | 8/2007 | E05B 83/24 |
| GB | 537634 | A | * | 2/1940 | E05B 85/24 |
| GB | 1232608 | A | * | 5/1971 | E05C 17/18 |
| GB | 2291465 | A | * | 1/1996 | E05B 65/0811 |
| GB | 2294080 | A | * | 4/1996 | E05B 65/0007 |
| JP | 49031127 | U | | 3/1974 | |
| JP | 2012107472 | A | * | 6/2012 | |
| KR | 20060058384 | A | * | 11/2004 | E05C 3/02 |
| KR | 200391122 | Y1 | * | 8/2005 | |
| KR | 20160014531 | A | * | 2/2016 | E04F 19/083 |
| SE | 504468 | C2 | * | 2/1997 | E05B 65/00 |
| WO | WO-9935046 | A1 | * | 7/1999 | E05B 65/006 |
| WO | WO-2009035349 | A2 | * | 3/2009 | E05B 65/006 |

* cited by examiner

CLOSURE DEVICE, PREFERABLY FOR CLOSING A SEALING FLAP OF AN OPENING

BACKGROUND

The invention relates to a closure device having a lock element that can be locked on a mating piece, preferably for closing a sealing flap of an opening, in particular an inspection flap, preferably in a drywall construction, in particular for a wall or a ceiling.

A closure device of the aforementioned generic type is known, for example, from DE 37 36 060 C1.

In the known closure device, a lock element is substantially latched and unlatched on a U-shaped spring by changing its position. Here, cones for spreading the spring legs play a part.

This known closure device is very simply constructed and, as a rule, fulfils its purpose.

Nevertheless, the invention is based on the object of proposing an alternative closure device which, if necessary, operates reliably even under high loadings.

SUMMARY

According to the invention, this object is achieved by a closure device which is distinguished by the fact that the lock element is arranged in such a way that, preferably under the action of a spring, in a first position with respect to the mating piece it is or can be moved into a locking position and, in a second position, it reaches a position and/or a state without any blocking action.

As distinct from the aforementioned prior art, the lock element of the closure device according to the invention does not latch or lock on a spring but preferably with the aid of a spring. As a result, in particular stable mechanical locking and secure closure is advantageously possible as a result of the closure device according to the invention, even quasi-automatically during a movement under spring action. This stable and reliable locking in particular makes sealing flaps suitable and fit even under enhanced fire protection regulations.

For this purpose, according to the invention, provision is made in a refined manner for the lock element, when it is moved into a first (closed) position, preferably by hand by pressing shut a sealing flap, for example, to lock or latch in automatically on the mating piece, preferably under the action of the spring. If the lock element is then moved forcibly into the second position, once more preferably by hand, the lock element can be brought or preferably forced, preferably automatically, into a position in which it no longer blocks. As will be explained further below, in particular a positive guide, preferably an entry guide path, can be provided and be helpful for the forcible movement of the lock element into a non-blocking position.

In a preferred embodiment of the closure device according to the invention, provision is made for the first position to be closer to the open position of the lock element than the second position.

This means that in the method outlined further above for bringing it into the second position, the lock element is not moved in the direction of the open position but is pressed further beyond the first closed position, so that the lock element firstly reaches a non-blocking position, can preferably be moved by the spring, and so that after that the closure device can be moved into its open position without the lock element (still) getting in the way on the mating piece.

A preferred development of the invention provides for the lock element to be mounted on a shaft such that it can be rotated under the influence of the spring. For this purpose, the shaft of the lock element is preferably orthogonal to the direction of movement from the first to the second position. As a result, it is particularly advantageously possible for the lock element in the first position to be placed substantially transversely with respect to this direction of movement and to lock on the mating piece while, in the second position, it can be rotated onward until it is substantially aligned with the direction of movement and no longer blocks. The shaft can be a separate component but, preferably, stub axles or axle journals can be moulded as regions of the lock element, which stub axels or axle journal are otherwise rotatably mounted in bearings of the closure device. In other words, the lock element can be rotatable about a shaft or rotatable with its shaft. A quasi-combined formation is also conceivable to the extent, for example, that the lock element can be rotated on a separate shaft but, for its better guidance on the shaft, itself has at least one moulded shaft bush section through which the shaft is led.

According to a particularly simple and advantageous development of the closure device according to the invention, provision is made for the spring to be a leg spring mounted on the shaft, of which leg spring one leg acts on the lock element and the other leg is supported on an abutment. For this purpose, in a particularly straightforward manner, for example, a bent-over end of the leg spring, which leg spring is preferably bent from a wire, could be introduced into a receiving hole in the lock element, and the other end can be supported on part of the closure device, with respect to which the lock element is arranged to be relatively movable. Instead of a leg spring, however, use could also be made of a spiral spring, for example, which is led around the shaft, preferably to form at least one closed circle, and forms a tension spring which exerts a tensile force with the direction of action in which a leg spring would exert a compressive force.

According to a preferred development of the invention, the part of the closure device according to the invention on which the lock element is arranged so as to be relatively movable can be a holder, preferably a holder formed substantially as a freely projecting finger, which can be moved relative to the mating piece into the aforesaid first and second positions for the lock element. Such a preferred embodiment in particular facilitates the closure of a sealing flap which, as already outlined, can simply be pushed shut, the free end of the finger which finger projects in the manner of a lance substantially in the closing direction, with the lock element simply moving past part of the mating piece, for example, and the lock element, as soon as it has reached the first position, simply engaging at least partly behind this part of the mating piece, for example, under the action of the spring. At the same time, at this instant and/or in this position, a blockade can have the effect that the lock element, despite the continuing action of the spring, does not yet move onward but possibly only does so when the holder or finger is forcibly moved further into the second position.

One preferred embodiment of the closure device according to the invention provides that the mating piece has a receptacle for the finger. In a simple case, the receptacle can substantially be an opening, for example a hole in a striker plate as which at least one part of the mating piece can preferably be formed, or be an eyelet of the mating piece, such that the holder that is preferably formed as a finger is able to penetrate and to a certain degree is also preferably guided.

Another development of the invention is distinguished by the fact that the mating piece is substantially formed as a fitting, in particular if appropriate preferably a corner fitting, of an opening edge or opening frame of an opening to be closed. In this way, a sealing flap of an opening can be closed reliably and in a targeted manner and exactly and, preferably at the same time, the opening edge or the opening frame of this opening can be reinforced. Of course, according to the invention, it is also possible for a plurality of closure devices, in particular at least two, to be used, for example in two corners. In the case of a sealing flap that is pivotably articulated to the opening, for example two closure devices can be provided on the free corners remote from the joint of the sealing flap. In a corresponding way, according to the invention provision can preferably be made for the lock element to be part of a closure means of a sealing flap of an opening to be closed.

The closure means can preferably be a fitting or part of a fitting, with corresponding advantages as have already been explained previously with respect to a fitting for the opening edge or the opening frame.

A preferred, particularly advantageous development of the invention is characterized in that the lock element has a latching jaw which, in the first position, locks with the mating piece. For this purpose, the latching jaw of the lock element preferably has a pawl region preferably acting in the direction counter to the direction of action of the spring.

The latching jaw form preferably provided in accordance with the invention has the special advantage that a situation can very simply be achieved in which a form-fitting engagement around part of the mating piece during the locking in the first position is possible, one region of the latching jaw, specifically the pawl region, blocking the closure means in the opening direction, and the other region of the latching jaw initially preventing any onward movement of the lock element into a non-blocking position, despite the spring continuing to act.

A development of the invention that is particularly advantageous for this purpose is preferably distinguished by the fact that the latching jaw has the pawl region in the region of one of its jaw faces, specifically on that jaw face which, in the first position, faces or is closer to the second position, and that the latching jaw has on its other jaw face a run-off flank which, during the position-change movement of the lock element from the first to the second position, forces the lock element to pivot in the direction counter to the spring action and releases the latching jaw in a position-change movement in the direction of the second position.

The region of the latching jaw which secures the closed position of the closure device, the pawl region, prevents opening of the closure device in the direction of an opening movement but not onward movement of the lock element in the direction of the second position, opposite to the opening direction. The automatic onward movement of the lock element in the direction of the second position is prevented by the second jaw region of the latching jaw, in that it blocks in this direction under the action of the spring. However, if, with a further application of force which is greater than the spring force, preferably by hand, the lock element is moved in the direction of the second position, then the run-off flank of the second jaw region assists the lock element being pressed counter to the active force of the spring, until this second jaw region of the latching jaw of the lock element comes free for an onward movement of the lock element in the direction of the second position.

Then, as soon as the lock element is entirely out of the locking region of influence of the mating piece, the action of the spring moves the lock element into the finally non-blocking position, so that the lock element can then be moved without interference in the opposite direction, that is to say in the opening direction, once more through the locking region of influence of the mating piece, back into the open position.

This backward movement of the lock element once more through the locking region of influence of the mating piece in the opening direction of the closure device can preferably be made even easier in that, in a preferred development of the invention, provision is made for the lock element to have an entry guide path, preferably an entry curve, preferably on its side facing away from the direction of the second position. If the lock element once more passes through the locking region of influence of the mating piece, in the course of the movement, the mating piece can force the lock element along the entry guide path in the direction of the action of the spring, out of the movement path into a non-blocking position. The mating piece or the entry guide path can assist the action of the spring or even overstretch the spring, that is to say, for example, convert the spring out of a neutral, unloaded situation from a compression spring into a tension spring, the tensile force of which, counter to the original compressive action of the spring, wishes to move the lock element in the direction of the blocking position, although this is prevented by the compulsion of the entry guide, until the lock element is entirely out of the locking region of influence of the mating piece.

A preferred development of the invention is distinguished by the fact that the lock element is formed substantially in the manner of a cam disc, which can have the various previously described regions and curves in an integrated manner.

A next development of the invention is distinguished by the fact that the lock element is arranged in a gap in the holder, preferably a holder formed as a finger, on a shaft at least partly bridging the gap.

Here, the lock element is securely held and embedded largely in the holder, and allows only its important functional regions to project functionally out of the gap, approximately in the manner of a wheel or star of a spur rowel.

BRIEF DESCRIPTION OF THE DRAWINGS

Exemplary embodiments, from which further inventive features can also be gathered but which in principle are to be viewed merely as exemplary and which are not intended to restrict the subject matter of the invention or its protective scope, are illustrated in the drawing, in which.

DETAILED DESCRIPTION

Figure 1:
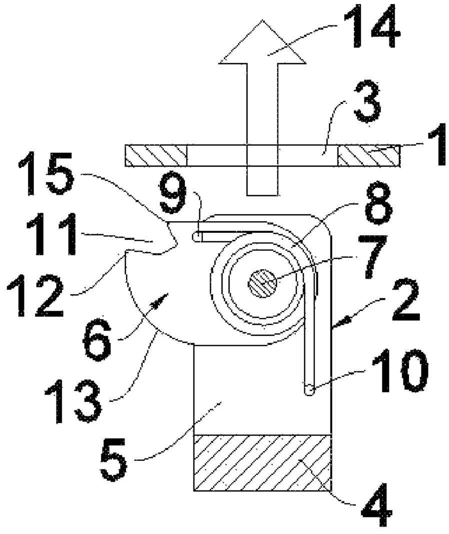
FIG. 1 shows a section through parts of a locking device according to the invention in a first position, namely in the open position.

FIG. 1 shows, in section, a part of a striker plate 1 of a mating piece and a part of a closure setup 2 from an exemplary embodiment of a closure device according to the invention. The striker plate 1 has a receptacle 3 for the part of the closure setup 2 that is shown.

Both the striker plate 1 and the closure setup 2 can each be parts of a fitting, and the fittings can in turn themselves be parts for an opening to be closed or for a sealing flap for such an opening.

The closure setup 2 has a holder 4 formed substantially as a finger, which has a gap or slot 5, in which a lock element 6 is mounted such that it can pivot on a shaft 7. On the shaft 7, the lock element 6 is subject to the active force of a spring 8, which can be formed simply as a leg spring or else, for example, also as a spiral tension spring. Of the ends or legs 9, 10 of the spring 8, one is connected to the lock element 6 and the other is connected to the holder 4.

The lock element 6 is formed substantially as a cam disc and, in particular, has a latching jaw 11 having a run-off flank 12 and an entry guide path 13. The functions of these aforementioned regions will be explained in more detail with the further figures.

FIG. 1 shows the closure setup 2 in a first position, namely in the open position of the closure device. To close the closure device, the closure setup 2 is moved in the direction of the arrow 14 into a next position, which is illustrated in FIG. 2.

Figure 2:
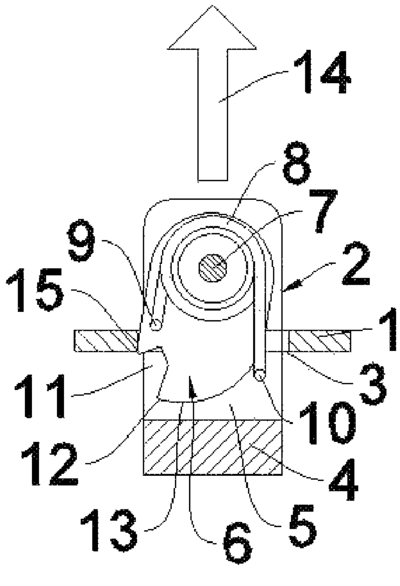
FIG. 2 shows the parts according to FIG. 1 in a second position, namely during closing.

FIG. 2 shows the parts according to FIG. 1 in a second position, although this is not yet the closed position. The same components are designated by the same reference numbers in FIG. 2, and also in the further figures, as in FIG. 1.

In the illustration of FIG. 2, the free end of the closure setup 2 with the lock element 6 has been inserted a little further into the receptacle 3 of the striker plate 1. In this second position, as compared with the first position in FIG. 1, an outer side of a jaw face 15 of the latching jaw 11 has struck an edge of the receptacle 3 and, as a result of the movement of the closure setup 2 counter to the action of the spring 8, no matter whether this spring is a compression or tension spring, has been forced in the direction of the slot 5 into the slot 5. As a result, the free end of the closure setup 2 can be moved in a streamlined manner with the inactive lock element 6 further in the direction of the arrow 14 through the receptacle 3.

Figure 3:
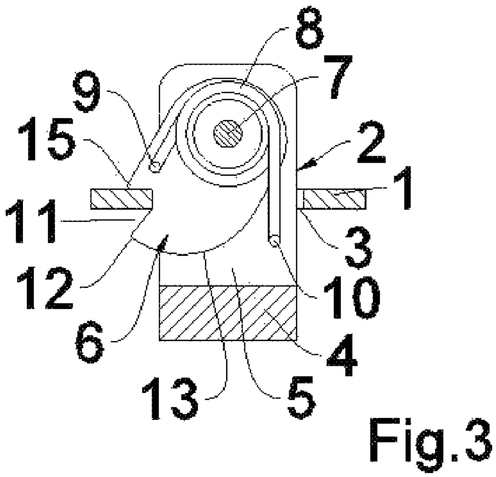
FIG. 3 shows the parts according to the preceding figures in a third position, namely in the locked position or closed position.

In FIG. 3 the closed or locked position of the closure device according to the invention is now shown as a third position.

In comparison with the second position in FIG. 2, the closure setup 2 has been pushed somewhat further into the receptacle 3 until the jaw face 15 comes behind the striker plate 1 and comes free of the edge of the receptacle, so that the lock element 6 was able to be pivoted out of the slot 5 somewhat under the action of the spring 8 but only until the latching jaw 11 engages around the edge of the receptacle 3 and locks with the latter, the run-off flank 12 now striking the edge of the receptacle 3 under the action of the spring 8 and, as a result, blocking further pivoting of the lock element 6.

The locking achieved in this way is so stable that, even under the direct action of force counter to the direction of the arrow 14, the closure device cannot be opened. In particular, a sealing flap locked in this way on or in a room ceiling would not open even as a result of its weight. According to the invention, this is achieved inter alia by the formation of the inner side of the jaw face 15 as a pawl surface.

In the claims and in this description, this third position is also designated as a first position of the lock element 6 with respect to the receptacle 3.

Figure 4:
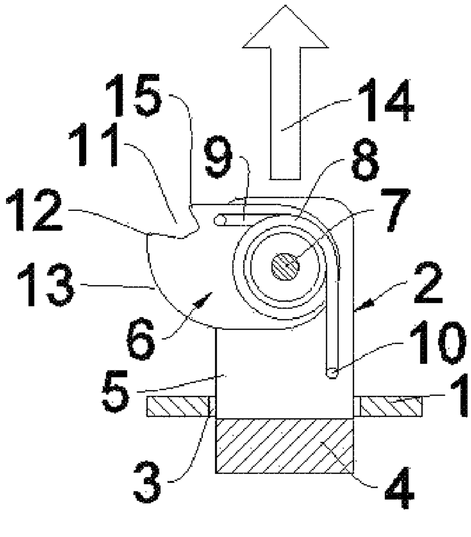
FIG. 4 shows the parts according to the preceding figures in a fourth position.

FIG. 4 shows a fourth position of the parts according to FIG. 1. In this fourth position, the lock element 6 is shown in a state of a position also known as the second position with respect to the receptacle 3; it is also possible for this second position to be reached even closer to the receptacle 3 as soon as the lock element 6 has reached the state shown in FIG. 4, that is to say has come completely free out of the receptacle 3, to be specific, as seen from the first position or open position according to FIG. 1, behind the receptacle 3 and behind the closed or locked position shown in FIG. 3, the so-called first position.

Although, in the locked position according to FIG. 3, the jaw faces of the latching jaw 11 block an automatic movement of the lock element 6 in both pivoting directions of the lock element 6, they cannot withstand a positive onward movement under the additional action of force in the direction of the arrow 14. The jaw face 15 is in any case not obstructive, since it blocks only in the direction counter to the arrow 14. However, the other jaw face cannot prevent such a movement either, since its inner side is formed as an oblique run-off flank 12 and therefore the force applied simply forces this run-off flank 12 out of the way counter to the action of the spring 8 with a force component.

With a further forced movement in the direction of the arrow 14, the lock element 6 can therefore assume the position shown in FIG. 4.

Figure 5:
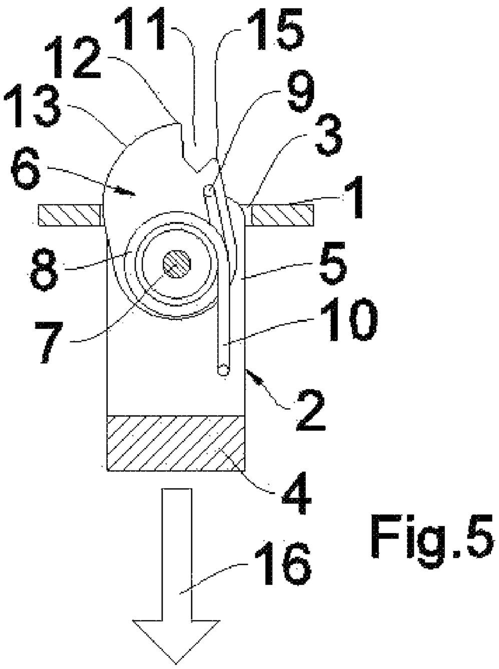
FIG. 5 shows the parts according to the preceding figures in a fifth position, namely during opening.

FIG. 5 shows a fifth position of the parts according to FIG. 1. In this position shown, the closure setup 2 has been moved back in the direction of the arrow 16 and in the direction of the open position according to FIG. 1. In the position shown, the lock element 6 is just passing again through the receptacle 3. It can be seen here that the position or the state of the lock element 6 in FIG. 4 already had no blocking action, since without a blockade, as now shown in FIG. 5, the lock element 6 can be rotated into a non-blocking position in which it is aligned with the holder 4 and can be led in an unimpeded manner through the receptacle 3. The entry guide flank 13 is helpful for the corresponding pivoting of the lock element 6 and its entry into the receptacle 3.

Figure 6:
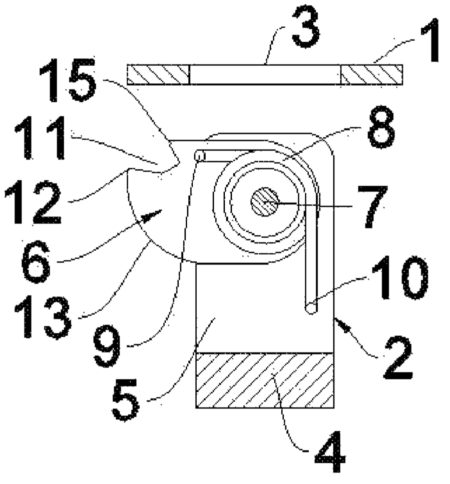
FIG. 6 shows the parts according to the preceding figures in a sixth position, namely once more in the open position, which once more corresponds to the first position in FIG. 1.

FIG. 6 shows once more the open position according to FIG. 1 and the completion of the closing/opening cycle of the closure device according to the invention.

Figure 7:
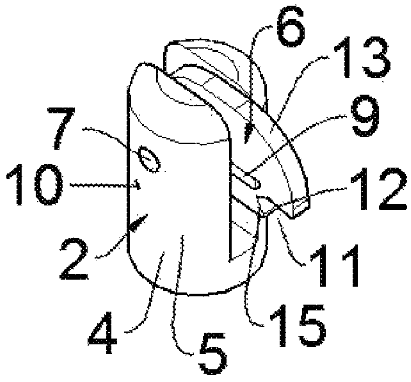
FIG. 7 shows a perspective view of a holder with an incorporated lock element of a closure device according to the invention according to the preceding figures.

FIG. 7 shows a perspective view of the part of the closure setup 2 according to the invention according to the preceding figures.

In FIG. 7, it can be seen particularly well how the lock element 6 is pivotably mounted on the shaft 7 in the slot 5 or gap of the holder 4. In addition, the finger shape of the holder 4 can clearly be seen. The lock element 6 can be recognized as a cam disc.

Figure 8:
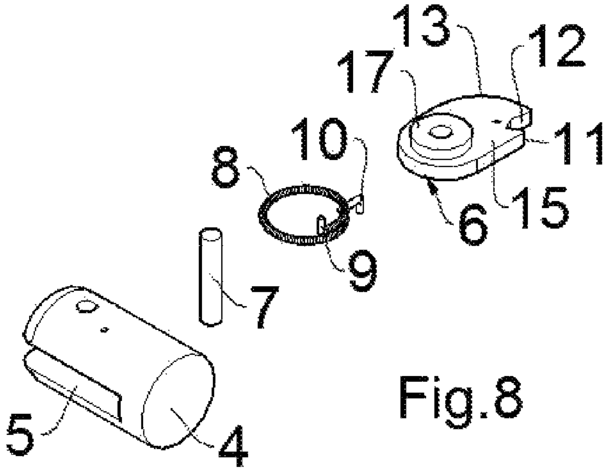
FIG. 8 shows an exploded illustration of the parts according to FIG. 7.

In FIG. 8, the parts of the closure setup 2 according to FIG. 7 are shown once more in an exploded illustration. Further details can be seen better from this illustration. The spring 8 is not shown as a leg spring here but as a strip-like spiral spring that can be loaded in tension and can be led around the shaft 7.

Additionally shown in FIG. 8 is a shaft bush section 17 for the shaft 7, moulded on the lock element 6.

Figure 9:
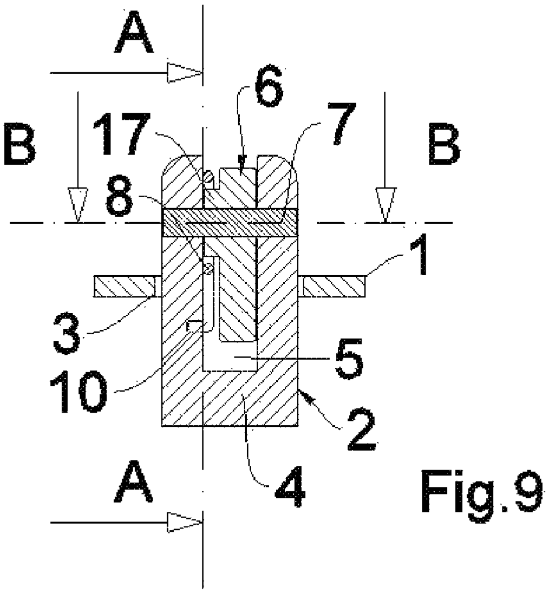
FIG. 9 shows a further section through the parts of a closure device according to the invention according to FIGS. 1 to 6.

FIG. 9 shows a different section through the closure setup 2 than FIGS. 1 to 6. While FIGS. 1 to 6 show the section plane designated by A-A in FIG. 9, FIG. 9 shows a longitudinal sectional plane substantially perpendicular thereto.

Figure 10:
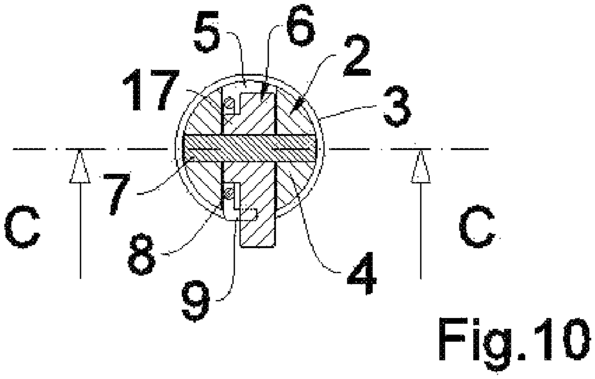
FIG. 10 shows a further section through the parts of a closure device according to the invention according to FIG. 7.

FIG. 10 shows a further, different section through the closure setup 2 according to the invention.

If FIG. 9 shows a longitudinal section in the section plane designated by C-C in FIG. 10, FIG. 10 shows a cross section in the section plane designated by B-B in FIG. 9.

Figure 11:
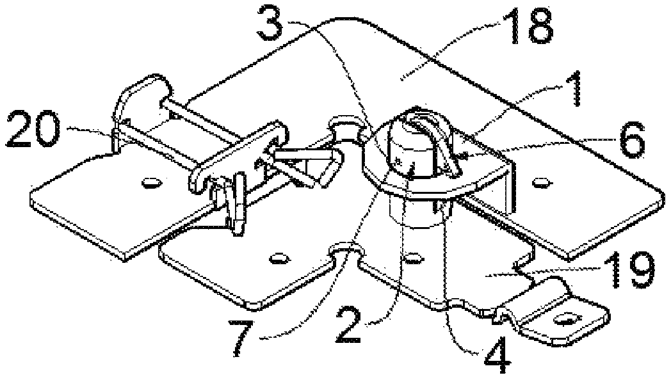
FIG. 11 shows a perspective view of fittings with a closure device according to the invention.

FIG. 11 shows once more, by way of example, in a perspective view, fittings for an inspection opening with inspection flap with a closure device according to the invention. The inspection opening and the inspection flap to close the same are themselves not illustrated. In FIG. 11, only a few reference numbers have been used for orientation, for the sake of clarity.

The fittings illustrated are corner fittings, preferably metal fittings, with which a frame or an edge of an inspection opening and a frame or edge of an inspection flap can also advantageously be reinforced. At the same time, these fittings can be fixed quickly and simply, for example with a few screws.

The outer fitting 18 has been mounted on the inspection opening; the inner fitting 19 has been mounted on the inspection flap.

Here, the inner fitting 19 bears the closure setup 2 with the lock element 6, and the outer fitting 18 bears the striker plate 1 with the receptacle 3.

Closure devices according to the invention can also be configured differently, more simply or else in a more complicated manner. For example, thought could be given to introducing a hole directly into an outer frame of the inspection opening as a receptacle 3 for the closure setup 2, if profiles of an outer frame of the inspection opening and of an outer frame of the inspection flap overlap, or the closure setup 2 with the lock element 6 could be fitted to a flat holder 4 on an outer frame of the inspection opening, the holder 4 projecting in parallel behind the inspection opening as a lug and thus also being able to form a stop for the inspection flap in its closed position. Such a holder 4 could possibly be fitted to the left and right of the outer frame. The receptacle(s) 3 for this purpose could then be provided simply on an edge or frame of the inspection flap.

Also indicated by way of example in FIG. 11 is an ejection spring 20, which ensures that when the closure device is unlocked, the inspection flap springs open slightly under spring pressure and can more easily be gripped and opened completely.

The invention claimed is:

1. A closure device comprising: a lock element that locks on a planar mating piece, wherein said lock element has a latching jaw and has an operative rotational range of motion of approximately 180 degrees;

a holder having a pair of peripheral edges and a top edge and which moves relative to said mating piece comprising a shaft, such that said lock element is pivotably mounted on said shaft, the shaft positioned on an end of the lock element away from the latching jaw;

a rotational spring secured to said holder and said lock element such that under the action of said rotational spring, said lock element rotates from a first position where said lock element is locked on said mating piece to a second position, where said lock element reaches a state without any blocking action; said rotational spring is mounted about said shaft and applies a rotational biasing force to said lock element in a direction transverse to the direction of motion of said holder, wherein said lock element rotates in a direction transverse to the direction of motion of said holder;

said locking element being configured and dimensioned to be completely within said peripheral edges, and said top edge in a closing position in said first position as said holder moves transversely relative to the mating piece, and in said second position, said locking element is moved perpendicularly to said holder through action of said rotational spring as said holder moves further relative to said mating piece in a direction of travel.

2. The closure device according to claim 1, characterized in that the rotational spring is a leg spring, of which one leg acts on the lock element and the other leg is supported on an abutment.

3. The closure device according to claim 1, characterized in that said holder is formed substantially as a freely projecting finger.

4. The closure device according to claim 3, characterized in that the mating piece has a receptacle for the holder, wherein the receptacle is substantially an opening.

5. The closure device according to claim 1, characterized in that the mating piece is at least one of: substantially formed in the manner of a striker plate and substantially formed as a fitting of an opening edge or opening frame of an opening to be closed.

6. The closure device according to claim 1, characterized in that the lock element is part of a closure setup of a sealing flap of an opening to be closed.

7. The closure device according to claim 1, characterized in that the closure setup is a fitting or part of a fitting.

8. The closure device according to claim 1, characterized in that the latching jaw, in the first position, locks with the mating piece, wherein the latching jaw has a pawl region acting in the direction counter to the direction of action of the spring.

9. The closure device according to claim 8, characterized in that the latching jaw has the pawl region in the region of one of its jaw faces, specifically on that jaw face which, in the first position, faces or is closer to the second position, and that the latching jaw has on its other jaw face a run-off flank which, during the position-change movement of the lock element from the first to the second position, forces the lock element to pivot in the direction counter to the spring action and releases the latching jaw in a position-change movement in the direction of the second position.

10. The closure device according to claim 1, characterized in that the lock element has an entry guide path on its side facing away from the direction of the second position.

11. The closure device according to claim 1, characterized in that the lock element is at least one of: formed substantially in the manner of a cam disc and arranged in a gap in the holder, on a shaft at least partly bridging the gap.

12. The closure device according to claim 1, wherein the lock element closes a sealing flap of an opening, in particular an inspection flap, in a drywall construction, in particular for a wall or a ceiling.

13. A closure device, comprising:

a locking element, with a latching jaw, that pivotally mounts on a shaft, said shaft positioned on an end of said lock element away from said latching jaw and locks on a mating piece, wherein said locking element has an operative rotational range of motion of approximately 180 degrees;

a holder upon which said lock element is pivotably mounted, said holder defining a slot in which said locking element pivots and which completely encloses said locking element in a closing position when said holder is engaging the mating piece; and a rotational spring mounted on said shaft and including two ends, one of said ends secured to said holder and the other of said ends secured to said lock element such that said rotational spring biases said locking element toward an open position transverse to a direction of motion of said holder relative to the mating piece, wherein said biasing force is applied perpendicularly to the direction of motion of said holder, wherein said lock element rotates in a direction transverse to the direction of motion of said holder.

14. The closure device according to claim 13, characterized in that said lock element has a latching jaw which locks with said mating piece.

15. The closure device according to claim 14, characterized in that said latching jaw has a pawl region acting in the direction counter to the direction of action of said rotational spring.

16. The closure device according to claim 13, wherein said holder and said locking element are configured so that said locking element pivots between a first position where said locking element is enclosed within said slot and said locking element does not project from said holder, and a second position where said locking element is perpendicular to a longitudinal axis of said holder.

17. The closure device of claim 13, wherein the mating piece is planar, and defines an opening, said holder being dimensioned so that when said locking element is in said first position, said holder and said locking element pass through said opening.

18. A closure device, comprising:

a locking element, with a latching jaw, that pivotally mounts on a shaft, said shaft positioned on an end of said lock element away from said latching jaw and locks on a planar mating piece;

a holder upon which said lock element is pivotably mounted, said holder defining a slot in which said locking element pivots and which completely encloses said locking element in a closing position when said holder is engaging the mating piece; and a rotational spring mounted on said shaft and including two ends, one of said ends secured to said holder and the other of said ends secured to said lock element such that said rotational spring biases said locking element toward an open position transverse to a direction of motion of said holder relative to the mating piece, wherein said biasing force is applied perpendicularly to the direction of motion of said holder, wherein said lock element rotates in a direction transverse to the direction of motion of said holder, wherein the mating piece is planar, and defines an opening, said holder being dimensioned so that when said locking element is in said first position, said holder and said locking element pass through said opening.

19. The closure device according to claim 18, characterized in that said lock element has a latching jaw which locks with said mating piece.

20. The closure device according to claim 19, characterized in that said latching jaw has a pawl region acting in the direction counter to the direction of action of said rotational spring.

21. The closure device according to claim 18, wherein said holder and said locking element are configured so that said locking element pivots between a first position where said locking element is enclosed within said slot and said locking element does not project from said holder, and a second position where said locking element is perpendicular to a longitudinal axis of said holder.

* * * * *